(12) United States Patent
Laperche

(10) Patent No.: US 12,729,708 B2
(45) **Date of Patent: *Sep. 8, 2026**

(54) DEVICE FOR CONNECTING TWO COMPONENTS WITH IMPROVED TENSILE STRENGTH

(71) Applicant: BONTAZ CENTRE, Marnaz (FR)

(72) Inventor: Matthieu Laperche, Marnaz (FR)

(73) Assignee: BONTAZ CENTRE, Marnaz (FR)

( * ) Notice: Subject to any disclaimer, the term of this patent is extended or adjusted under 35 U.S.C. 154(b) by 27 days.

This patent is subject to a terminal disclaimer.

(21) Appl. No.: 18/554,279

(22) PCT Filed: Apr. 8, 2022

(86) PCT No.: PCT/FR2022/050659
§ 371 (c)(1),
(2) Date: Feb. 16, 2024

(87) PCT Pub. No.: WO2022/214771
PCT Pub. Date: Oct. 13, 2022

(65) Prior Publication Data

US 2024/0191740 A1 Jun. 13, 2024

(30) Foreign Application Priority Data

Apr. 8, 2021 (FR) ...................................... 2103615

(51) Int. Cl.
*F16K 31/06* (2006.01)
*F16B 21/07* (2006.01)

(52) U.S. Cl.
CPC ........ *F16B 21/073* (2013.01); *F16K 31/0627* (2013.01)

(58) Field of Classification Search
CPC .......... F16K 1/48; F16K 11/044; F16B 21/16; F16B 21/071; F16B 21/073
See application file for complete search history.

(56) References Cited

U.S. PATENT DOCUMENTS 4,408,745 A * 10/1983 Swiers ...................... F16K 1/34 251/86
5,333,643 A * 8/1994 Gilchrist ............ F16K 31/0672 251/129.17
(Continued)

FOREIGN PATENT DOCUMENTS

DE 20000905 U1 4/2000
EP 1469207 A1 * 10/2004 ......... B60R 13/0206
(Continued)

OTHER PUBLICATIONS

EP 1469207 Translation (Year: 2004).*
(Continued)

*Primary Examiner* — Umashankar Venkatesan
(74) *Attorney, Agent, or Firm* — McDonald Hopkins LLC

(57) ABSTRACT

A device for connecting two parts intended to be stressed according to a first direction including a male portion and a female portion configured so that the male portion enters the female portion along a second direction normal to the first direction and clipping means configured to lock the male portion in position into the female portion in the second direction. The male portion includes, at a first end, an end portion whose outer surface is partially in the shape of a cylinder of revolution around the second direction and the female portion includes a seat of cylindrical shape of revolution configured to house, substantially without clearance, the end portion of the male portion.

16 Claims, 6 Drawing Sheets

(56) References Cited

U.S. PATENT DOCUMENTS

| | | | | |
|---|---|---|---|---|
| 10,100,967 | B2 * | 10/2018 | Bhatta | F16L 57/00 |
| 10,625,845 | B2 * | 4/2020 | Zhao | B64U 30/20 |
| 11,332,056 | B2 * | 5/2022 | Eldridge | B60N 2/5825 |
| 2005/0079010 | A1 | 4/2005 | Droppleman | |
| 2006/0081635 | A1 * | 4/2006 | Matsutori | H01L 21/67769<br>220/806 |
| 2008/0217573 | A1 | 9/2008 | Pulcini et al. | |

FOREIGN PATENT DOCUMENTS

| | | | |
|---|---|---|---|
| GB | 2059016 | A | 4/1981 |
| GR | 20060100673 | A | 7/2008 |
| WO | 9602730 | A1 | 2/1996 |

OTHER PUBLICATIONS

International Search Report for PCT/FR2022/050659 dated Jul. 7, 2022.

Written Opinion for PCT/FR2022/050659 dated Jul. 7, 2022.

* cited by examiner

DEVICE FOR CONNECTING TWO COMPONENTS WITH IMPROVED TENSILE STRENGTH

CROSS-REFERENCE TO RELATED APPLICATIONS

This is the National Stage application of PCT international application PCT/FR2022/050659, filed on Apr. 8, 2022, which claims the priority of French Patent Application No. 2103615, filed Apr. 8, 2021, both of which are incorporated herein by reference in their entireties.

TECHNICAL FIELD AND STATE OF PRIOR ART

The present invention relates to a device for connecting two parts having an improved tensile strength and a hydraulic distributor including at least such a device.

There are different devices and techniques for linking two elements. The hooping offers a very good mechanical resistance. It mainly applies to steel parts and requires the application of a certain temperature which can damage a portion of the assembled elements. Furthermore, the implementation of hooping requires special equipment.

Hot riveting is adapted for parts made of plastic material, however recasting a part made of plastic material can pose material resistance problems and the force required for shaping can damage the peripheral parts.

The implementation of the riveting also requires special equipment.

The securing by clipping or snap-fitting ensures an assembly based on the elastic deformation of the parts during the mounting. In general one of the parts to be assembled includes two branches and the other part includes a through bore. The two branches pass through the bore by being elastically deformed and resume a substantially undeformed position when the ends thereof open from the bore.

The assembly by clipping does not require specific equipment, but it generally offers a tensile strength which is not sufficient for certain applications, for example in the distributors for cooling circuits in the automotive field.

DISCLOSURE OF THE INVENTION

It is consequently an aim of the present invention to offer a device for connecting two parts not having the above drawbacks and offering at least increased tensile strength.

The aim stated above is achieved by a device for connecting two parts implementing at least one cylindrical bearing between the two parts which ensures at least the tensile strength of the connection between the two parts and clipping means which lock the two parts together in position.

The cylindrical bearing ensures better force transmission and a longer service life of the assembly.

In other words, unlike the device for assembling by clipping the state of the art in which the clipping means, i.e. deformable elastically elements ensure both the relative immobilisation of the two parts, and the assembly in the direction in which the assembly is stressed, the invention separates the two functions, the clipping means then not being stressed in the stress direction. Consequently, the tensile strength is ensured by the cooperation of two rigid parts. This results in a substantially increased mechanical strength in the stress direction.

For example, one of the parts includes a cylindrical or at least partially cylindrical element and the other part includes a cylindrical seat, the axis of the cylindrical element being normal to the stress direction and clipping means lock the cylindrical element in the seat thereof in the direction of the axis of the cylindrical element.

The cylindrical or at least partially cylindrical element can be carried by a rod. Advantageously, the free ends of the arms include a planar face which is normal to the stress direction intended to come into contact with a shoulder coupling the cylindrical element and the rod. This contact improves the alignment of the two parts and the compressive strength of the connection.

In an exemplary embodiment, the device includes two cylindrical elements with a parallel axis and which are disposed and arranged next to each other ensuring a certain hyperstatism of the connection.

Preferably the different parts of the connecting device are made of the same material allowing obtaining a constant assembly regardless of the temperature. The material is advantageously little deformable in bending. For example the material is a plastic material.

An object of the present application is then a device for connecting two parts intended to be stressed according to a first direction including:

- a male portion and a female portion configured so that the male portion enters the female portion along a second direction normal to the first direction and configured so that the male portion is retained in the female portion in the first direction by a cylindrical bearing,
- clipping means configured to lock the male portion in position into the female portion in the second direction.

In an advantageous example, the male portion includes, at one first end, an end portion whose outer surface is partially in the shape of a cylinder of revolution around the second direction. The female portion can include a seat of cylindrical shape of revolution configured to house, substantially without clearance, the end portion of the male portion. The clipping means can include a first portion carried by the male portion and a second portion carried by the female portion.

Preferably, the seat is delimited by two opposite arms and the second portion of the clipping means is carried by one free end of the arms.

The seat and the clipping means can be arranged such that, when the end portion slides in the seat along the second direction, the arms move apart along a third direction normal to the first direction and to the second direction until the first portion of the clipping means cooperates with the second portion of the clipping means.

In an advantageous example, the male portion includes an intermediate portion between the first portion of the clipping means and the end portion, which includes two convex lateral surfaces centred on an axis which is parallel to the axis of the end portion. The arms include, between the seat and the free end thereof, a concave surface centred on an axis which is parallel to the axis of the seat and together defining a housing for the intermediate portion.

Advantageously, the clipping means include contacting surfaces in the second direction and the male portion and the female portion include contacting surfaces in the first direction, the surfaces of the clipping means and the surfaces of the male and female portions being distinct.

According to an additional feature, the clipping means include bosses cooperating with recessed housings.

The free ends of the arms carrying the second portion of the clipping means can include inclined faces so as to facilitate the clipping.

Preferably, the free ends of the arms each include a planar face contained in a plane normal to the first direction, and the male portion includes at least one planar face configured to cooperate with the planar faces of the second ends of the arms.

Advantageously, at least the end portion of the male portion has a circular cross section.

For example, the male portion and the female portion are made of the same material, advantageously of plastic material, for example selected from polyphenylene sulphide (PPS), the family of polyethersulphones (PESU), polyetheretherketone (PEEK) and polyphthalamide (PPA).

Another object of the present application is a method for assembling a first part and a second part by means of the connecting device according to the present invention, the first part including the male portion and the second part including the female portion:

- alignment of the male portion and the female portion in the second direction,
- insertion of the male portion into the female portion by relative displacement along the second direction until engagement of the clipping means.

Another object of the present application is a hydraulic distributor including an electromagnetic actuator, a first piston cooperating with a piston seat, and at least one device for connecting, according to the invention, the first piston and a rod secured to a core of the actuator at least in the first direction.

The distributor can be a 3/2 distributor including a second piston secured to the first piston in the first direction, the second piston cooperating with a piston seat, the first piston and the second piston being aligned in the first direction.

Another object of the present application is a hydraulic circuit including at least one hydraulic distributor according to the invention, a fluid source which is connected to the hydraulic distributor.

Another subject of the present application is a cooling circuit for a motor vehicle including at least one hydraulic distributor according to the invention, a coolant source which is connected to the hydraulic distributor.

BRIEF DESCRIPTION OF THE DRAWINGS

The present invention will be better understood based on the following description and the appended drawings in which.

DETAILED DISCLOSURE OF PARTICULAR EMBODIMENTS

Figure 1A:
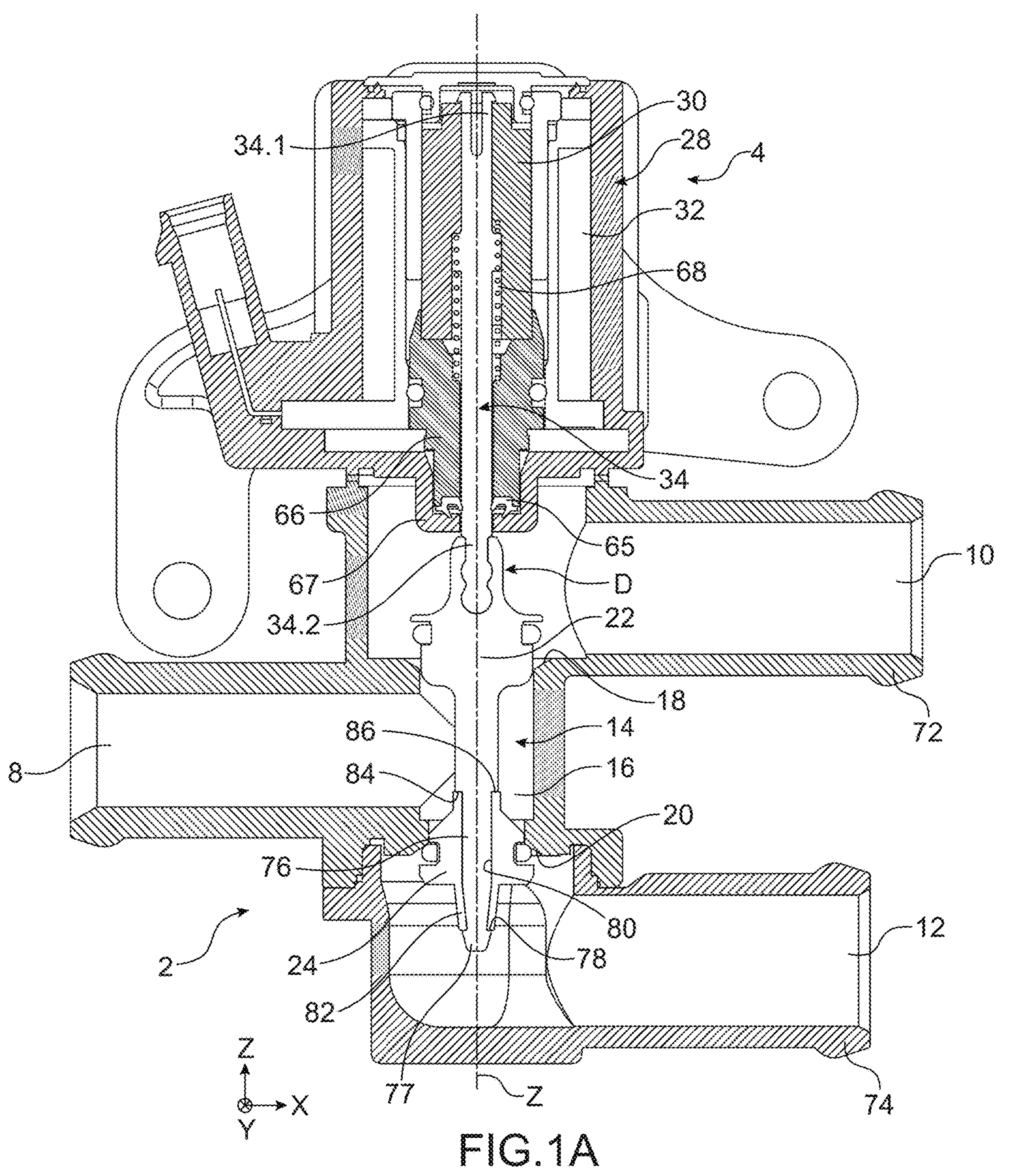
FIG. 1A is a longitudinal sectional view of an example of a 3/2 hydraulic distributor implementing a connecting device according to an exemplary embodiment.
Figure 1B:
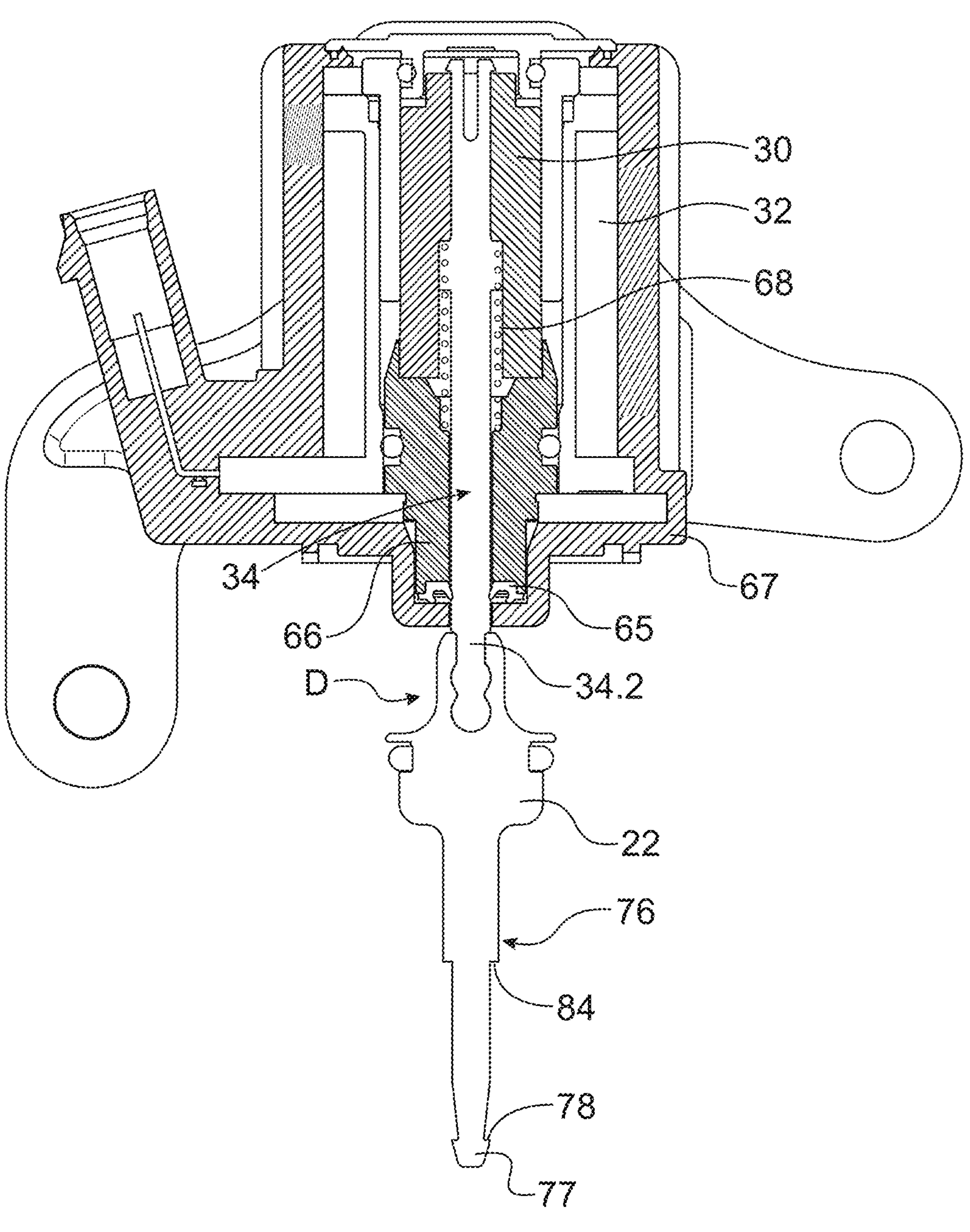
FIG. 1B is a longitudinal sectional view of the distributor of FIG. 1A without the hydraulic casings, nor the second piston.

The connecting device D according to the invention is intended to secure two parts together. In the following description which, the connecting device D will be described more particularly as a device for connecting a shutter or piston and an electromagnetic actuator of a distributor which is represented in FIGS. 1A and 1B. It will be understood that the connecting device according to the invention can ensure the mechanical connection between two parts intended to slide along a first direction.

In this non-limiting example, the distributor is a 3/2 distributor including a hydraulic portion 2 and an electromagnetic actuating portion 4.

The hydraulic portion 2 includes a body provided with an inlet 8 and two outlets 10, 12 and movable equipment 14 intended to direct the fluid from the inlet 8 to either one of the outlets 10, 12. The inlet 8 and the two outlets 10, 12 are coupled to a channel 16 in which the movable equipment is slidably mounted along a first direction Z. The channel 16 has two valve seats 18, 20 and the movable equipment 14 includes two shutters or pistons 22, 24 arranged on the movable equipment and relative to the seats 18, 20 such that the shutter 22 can bear against the valve seat 18, and the shutter 24 can come into contact with the valve seat 20 alternatively. Depending on the axial position of the movable equipment 14 in the channel 16, either the piston 22 is bearing against the valve seat 18 and the fluid circulates from the inlet to the outlet 12, or the piston 24 is bearing against the valve seat 20 and the fluid circulates from the inlet 8 to the outlet 10.

The movable equipment 14 is mechanically connected to an electromagnetic actuator 28 including a core 30 which is mounted in a coil 32. The core 30 is capable of being axially displaced along the first direction Z in the coil 32 when a current flows therethrough. The core 30 is secured in movement to the movable equipment 14 along the first direction Z. In this example, the axial securing of the core and the movable equipment is obtained by a rod 34 connected by a first end 34.1 to the core 30 and by a second end 34.2 to the movable equipment.

In this example, the end 34.2 of the rod 34 is connected to the movable equipment 14 by the connecting device D whose details are shown in FIGS. 2 to 10.

The connecting device D includes a male portion M (FIGS. 7 to 10) carried by the first end of the rod 34 and a female portion F (FIGS. 4 to 6) carried by a longitudinal end of the movable equipment 14.

Figures 8, 9, 10:
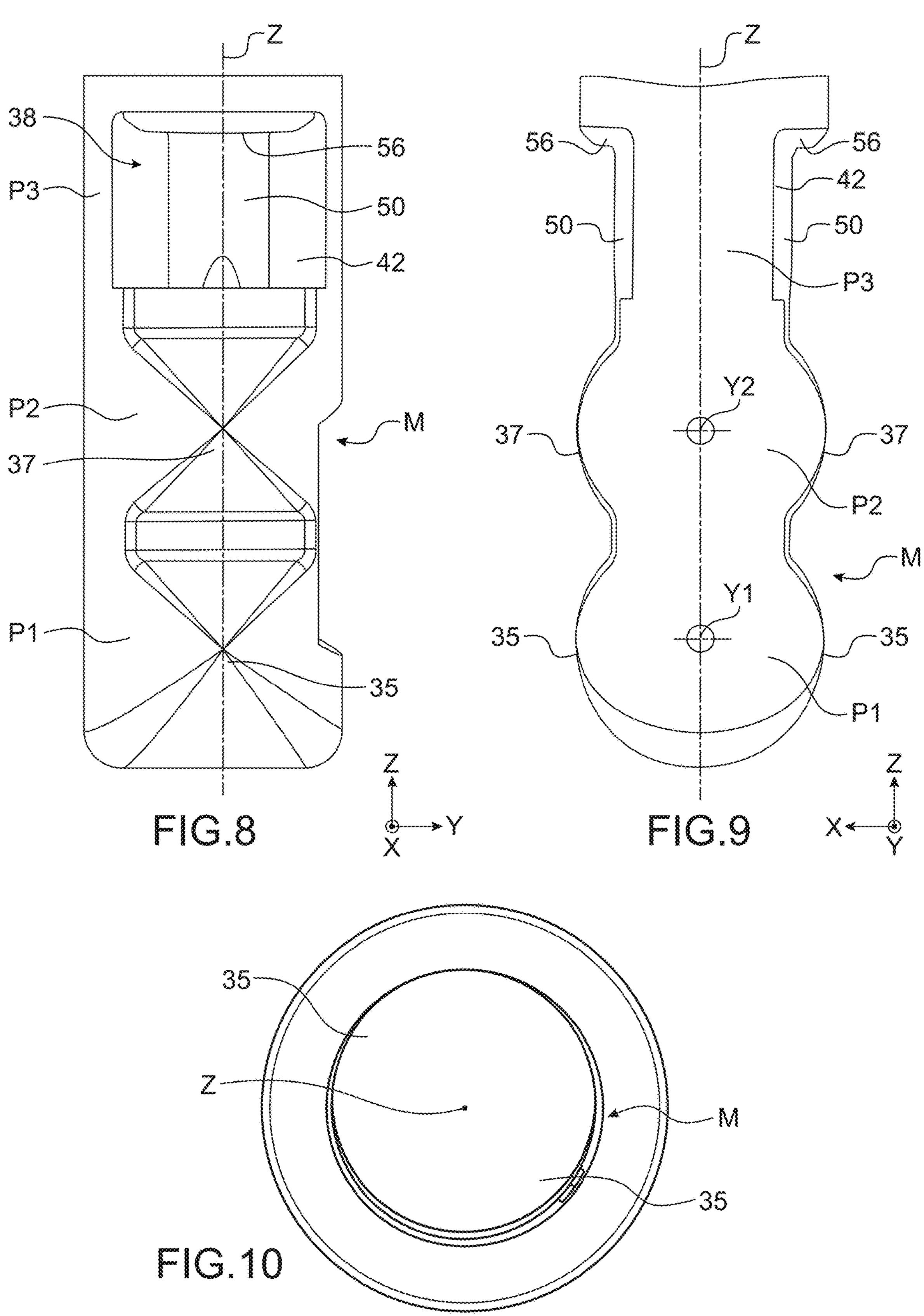
FIG. 8 is a side view of the male portion of FIG. 7.
FIG. 9 is a front view of the male portion of FIG. 7.
FIG. 10 is a bottom view of the male portion of FIG. 7.

In FIGS. 8 and 9, it is possible to see a view of the male portion M in the direction X and the direction Y respectively normal to the first direction Z. The male portion M includes three portions:

- a first end portion P1,
- a second intermediate portion P2,
- a third portion P3 for connection with the rod 34.

The first end portion P1 includes two convex lateral surfaces 35 which are centred on an axis Y1 parallel to the direction Y, which meet at the free end of the male portion M and delimit a shape having a partially cylindrical outer surface with an axis Y1.

The second portion P2 includes two convex lateral surfaces 37 centred on an axis Y2 parallel to the axis Y1. Each lateral surface 37 joins a lateral surface 35 of the end portion P1. The first P1 and second P2 assembled portions form approximately an 8 (FIG. 9).

The connecting portion P3 includes two parallel flats 42 on either side of the Z axis.

In the represented example and advantageously, the male portion M has a circular section transverse to the axis Z as shown in FIG. 10. This shape has the advantage of allowing the male portion M to pass into a circular shape or into a seal without risk of damage.

In FIG. 8, it is possible to see the male portion seen in the direction X.

The connecting device D includes clipping or snap-fitting means between the male portion and female portion. The term "clipping means" designates means ensuring an assembly based on the elastic deformation of the parts during the mounting. The male portion M includes a first portion 38 of the clipping means located in the connecting portion P3 and configured to cooperate with a second part of the clipping means carried by the female portion.

Figure 4:
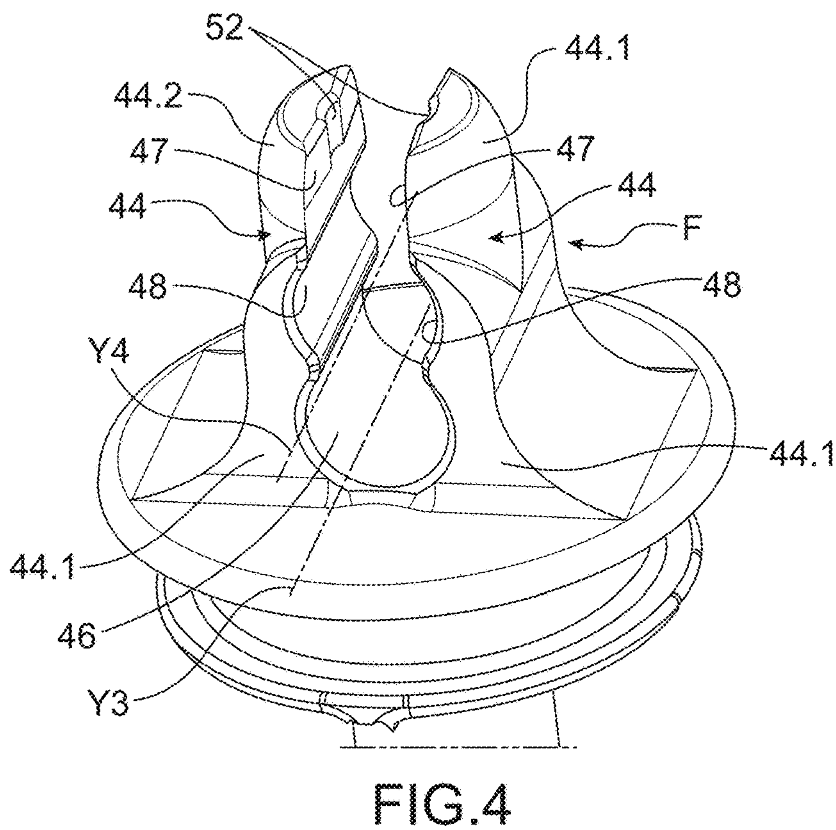
FIG. 4 is a perspective view of the female portion of the connecting device of the FIG. 2 represented alone.
Figure 5:
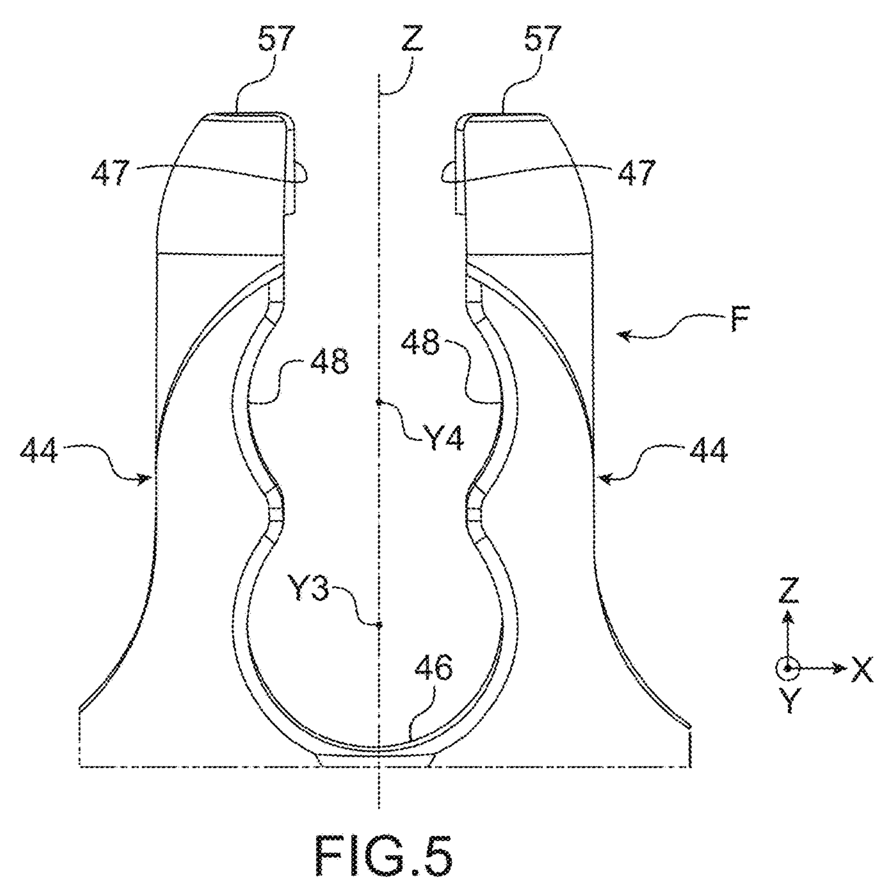
FIG. 5 is a side view of the female portion of the connecting device of FIG. 4.
Figure 6:
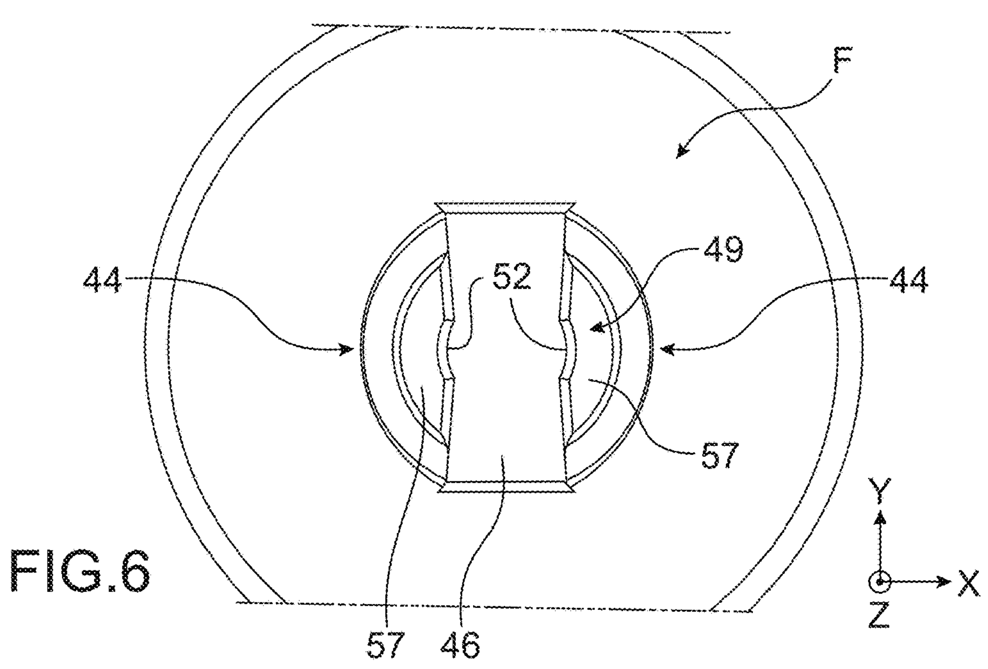
FIG. 6 is a top view of the female portion of FIG. 4.

The female portion F represented alone in FIGS. 4 to 6 includes two arms 44 connected by a first end 44.1 which define therebetween a concave seat 46 to house the end portion P1. The seat 46 extends along an axis Y3 parallel to the direction Y and has a cross section corresponding to the cross section of the end portion P1, such that the end portion P1 can be mounted by sliding in the seat 46 with very low clearance. The outer diameter of the cylindrical element is substantially equal to the inner diameter of the seat 46 at the ready mounting clearance. Preferably, the diameter clearance is comprised between 0 μm and 40 μm according to the ISO tolerance H8h7 for a standard Shaft in Bore assembly.

The two arms 44 each include a second free end 44.2, both second ends 44.2 being provided with faces 47 which are opposite to each other and spaced apart from each other to allow the passage of the connecting portion P3.

Between the seat 46 and the free ends 44.2 of the arms, each of the arms 44 includes at least one concave surface 48, the 2 arms forming for example, as illustrated in FIG. 4, two opposite concave surfaces 48, centred on an axis YA parallel to the axis Y3 and each of the concave surfaces 48 having a radius of curvature corresponding to the radius of the convex lateral surfaces 37 of the intermediate portion P2.

The second ends 44.2 of the arms 44 also include the second portion 49 of the clipping means which is complementary to the first portion 38 of the clipping means carried by the connecting portion P3.

In the represented example, the convex surfaces 35 of the end portion P1 and the convex surfaces 37 of the intermediate portion P2 have the same radius of curvature. Alternatively, the convex surfaces 35 and 37 have different radii of curvature. Preferably, the radius of curvature of the convex surfaces 37 is greater than that of the convex surfaces 35 offering a better stress distribution.

In this example, the first portion 38 of the clipping means includes two bosses 50, each protruding from a flat 42, and the second portion 49 of the clipping means include two recessed housings 52 each formed in a face 47 of a second end 44.2 of the arms. During the assembly, the bosses 50 enter the housings 52.

Preferably, the faces 47 are not flat but each have a slope oriented so as to facilitate the spacing of the arms from each other in the third direction X by cooperation with the bosses 50, and the insertion of the protruding bosses into the housings.

In the represented example, the bosses 50 are formed by a cylinder portion with an axis parallel to the Z axis, the housings 52 have a corresponding shape.

The arms 44 have a sufficient thickness so that the seat 46 is rigid and does not deform under the action of a tensile force. The free ends 44.2 do not require a significant elasticity to allow the bosses to be clipped into the housings, but a slight bending is available at the end of the arms.

Preferably, the connection between the connecting portion P3 and the rod is made by planar surfaces 56 and the ends 44.2 of the arms include planar faces 57 in the XY plane intended to cooperate with the planar surfaces 56, which allows ensuring a certain alignment between the two assembled parts, facilitating the insertion, during the assembly, into the body of the distributor. When the parts come closer to each other, they bear against each other by planar surfaces, which improves the compressive strength of the assembly.

Figure 2:
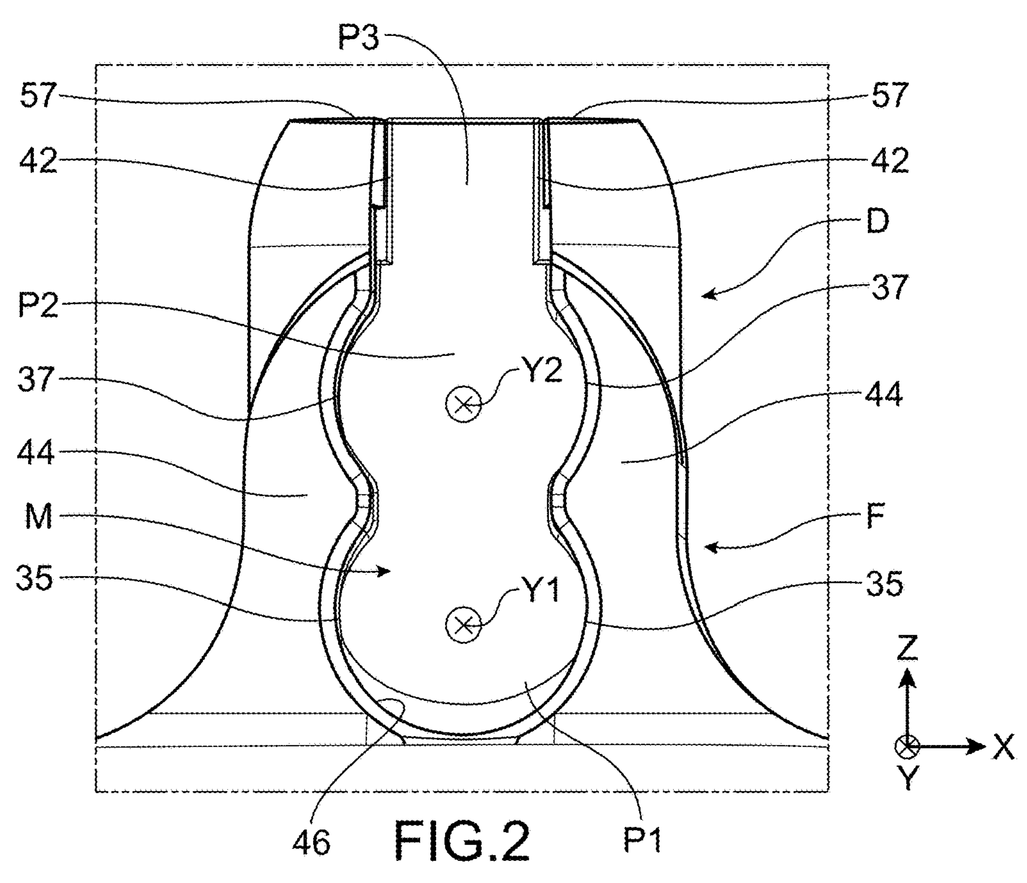
FIG. 2 is an enlarged view of one face of the connecting device implemented in the distributor of FIGS. 1A and 1B.
Figure 3:
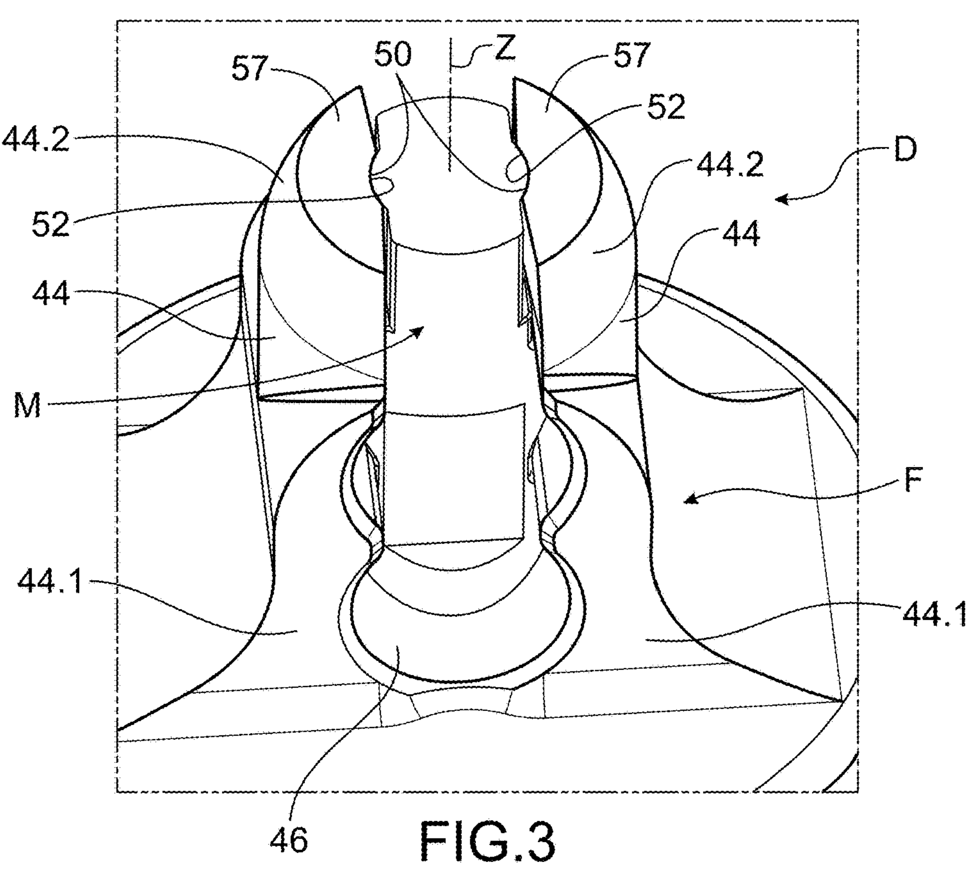
FIG. 3 is a perspective view of an opposite face of the connecting device of FIG. 2.

The assembly method takes place as follows:

The male portion M is approached laterally from the female portion F in the direction Y so as to align the axis Y1 of the end portion P1 with the axis Y3 of the seat 46. Then the male portion M is displaced in the direction Y so as to enter the end portion P1 into the seat 46, the intermediate portion P2 between the two concave surfaces 37 and the connecting portion P3 between the two free ends 44.2 of the arms 44. The faces of the connecting portion P3 of the male portion then cooperate with the faces of the second ends 44.2 of the arms. Due to the slopes of the faces 47, the second ends 44.2 of the arms elastically move away from each other allowing the insertion further of the male portion M into the female portion F in the direction Y, until the bosses 50 enter the housings 52. The arms 44 return to their undeformed position (FIGS. 2 and 3). The two parts are then held in the direction Y by clipping. Moreover, the cooperation of the end portion P1 with the seat 46 ensures the securing of the two parts in the direction Y. The intermediate portion P2 cooperating with the concave surfaces of the arms increases the degree of hyperstatism of the connection. Thus it is not the clipping means which ensure the mechanical strength in the direction Z.

This assembly offers an increased resistance in the direction Z, both compressive and tensile, in comparison with clipping connections of the state of the art. This exemplary embodiment advantageously implements cylindrical contacts, which increases the service life of the assembly and offers a better force transmission. The connecting device has a great robustness.

Alternatively, the male portion only includes an end portion P1 and a connecting portion P3 and the arms 44 of the female portion only delimit a seat 46 and the passage between the free ends 44.2. According to this variant the strength in the direction Z, both compressive and tensile strength, is equivalent to that of the connection of FIGS. 2 and 3, but it has a slightly reduced hyperstatism.

It will be understood that the connecting device can include more than one intermediate portion.

Preferably the male portion and the female portion are made of the same material, which allows obtaining an assembly which does not change depending on the temperature. Alternatively the male portion and the female portion are made of materials having close or equal thermal expansion coefficients.

Preferably, the chosen material(s) is/are little or non-deformable in bending and have low elasto-plastic deformations. For example, the materials have a break strain in the range of 2% and a Young's modulus in the range of 12,000 MPa.

Advantageously the male portion and the female portion are made of plastic material, preferably by moulding, preferably by plastic injection. The plastic material is preferably polyphenylene sulphide (PPS). Alternatively it can be selected from the family of polyethersulphones (PESU), polyetheretherketone (PEEK) and polyphthalamide (PPA).

We will now describe more particularly the invention applied to the manufacture of the 3/2 distributor, of FIGS. 1A and 1B.

The connecting device according to the invention is particularly adapted to connect the core of an electromagnetic actuator to a piston.

In this example, the core is secured in the direction Z to the piston by the rod 34 which is itself secured in the direction Z to, on the one hand, the core and, on the other hand, the piston.

The core has a tubular shape crossed by a bore 58.

Figure 7:
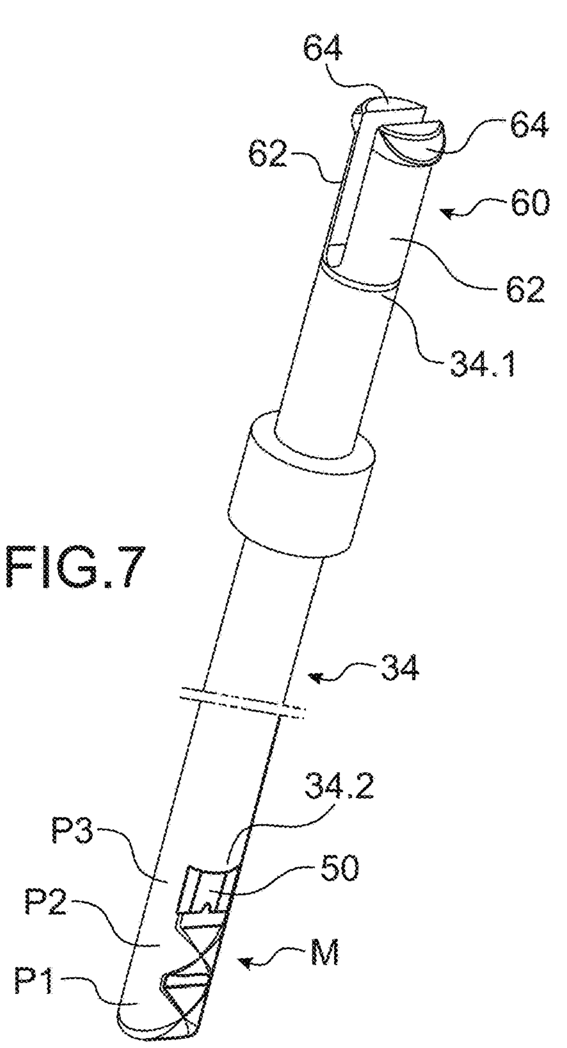
FIG. 7 is a perspective view of a connecting rod implemented in the distributor of FIG. 1A including the male portion of the connecting device of FIG. 2.

The rod 34, represented alone in FIG. 7, includes, at a first longitudinal end 34.1, clipping means 60 ensuring the securing of the rod and the core and, at a second longitudinal end 34.2, the male portion M of the connecting device of FIGS. 2 and 3.

The clipping means 60 include two lugs 62 which are parallel to the axis of the rod 34 and provided, at the free end thereof, with radial outward extensions 64. During the assembly of the rod 34 and the core, the lugs 62 enter through one end of the bore of the core 30 by moving closer to each other by elastic deformation, the rod 34 is displaced axially in the bore until the radial extensions 64 open from the bore, allowing the lugs to return to their initial shape and to ensure, with the radial extensions, an axial securing of the core and the rod.

After this assembly has taken place, the rod 34 and the core are placed in the body of the actuator, for this the second end 34.2 carrying the male portion is inserted into the body of the actuator and passes through a seal 65 mounted between a casing 67 of the actuator and a part 66 which ensures the closure of the magnetic loop. The part 66 forms a seat for the seal 65 and also ensures the function of a seat for a spring 68 interposed between the core and the part 66. Spring 68 is intended to be used as a return spring and is stressed in compression.

Thanks to the circular cross section of the connecting device D and the rod 34, the seal 65 is not damaged by the passage of the male portion of the connecting device.

The first piston 22 includes, at a first longitudinal end, the female portion F of the connecting device. In this example, the first piston 22 is configured to be connected to a second piston 24, the second end thereof is then provided for a connection to another piston.

The first piston 22 is fastened to the rod 34 according to the steps described above, the female portion F carried by the first piston 22 is laterally moved closer to the male portion F carried by the rod 34 until the bosses 50 are inserted into the housings 52.

The spring 68 is then kept compressed in the body of the actuator and ensures a return force in the direction Z so as to bring the piston of the casing 67 closer to the actuator, the planar faces carried by the free ends 44.2 of the arms 44 then cooperate with a planar face of the casing 67 of the actuator which ensures the first piston to remain aligned with the axis Z and facilitate the assembly of the second piston which will be mounted on the other end of the first piston.

In FIG. 1A, a complete distributor can be seen comprising the second piston 24 and the first 72 and second 74 hydraulic housings.

When assembling the distributor, after securing the core to the first piston via the rod 34, the casing 72 is mounted around the first piston 22 and is fastened, for example welded, to the casing 67 of the actuator. Due to maintaining the first piston aligned in the Z direction, its passage through the first casing 72 is facilitated. Then the second piston 24 is secured to the second end of the first piston 22, for example by clipping. For example, the first piston 22 is extended by a rod 76 provided with a head 77 with a diameter which is greater than that of the rod 76, the head 77 delimiting, with the rod 76, a first shoulder 78. The second piston 24 is crossed by a passage 80 and is provided, on the face opposite to that oriented towards the first piston 22, with two lugs 82 extending axially in the extension of the passage 80 and whose free ends are intended to cooperate with the shoulder 78 by clipping. Furthermore, the rod 76 includes a second shoulder 84 downstream of the shoulder 78 in the direction of insertion of the piston on the rod 76 and facing the first shoulder 78. The axial position of the second shoulder is chosen so as to bear against an axial end 86 of the second piston 24 on the face opposite to that carrying the lugs 82. The cooperation of the lugs and the first shoulder and the bearing of the axial end 86 and the second shoulder 84 ensure the axial immobilisation of the second piston relative to the first piston. Alternatively the second shoulder is replaced by other clipping means cooperating with the axial end 86. Alternatively, the second piston 24 can include more than two lugs 82, for example three lugs or four lugs.

The operation of assembling the second piston on the first piston is carried out as follows:

The head 77 enters the second piston, exits the passage, slides between the lugs 82 which it elastically deforms. The head slides between the lugs until it escapes therefrom. The lugs 82 return to their undeformed position and bear against the shoulder 78. Simultaneously the axial end 86 of the piston bears against the second shoulder 84 ensuring an axial immobilisation of the second piston on the first piston.

This assembly is also facilitated by the aligned position of the first piston. This assembly offers a very good strength because the lugs are then stressed in compression by the hydraulic pressure which is exerted on the second piston downwards in the representation of FIG. 1A.

Then the second casing 74 is fastened, for example welded on the first casing 72.

In the description above the male portion is carried by a rod. It will be understood that this can be carried by any part having a different shape. It is the same with the female portion.

Advantageously, means (not represented) can be provided to immobilise in rotation the first piston about the axis Z relative to the rod 34 and the second piston relative to the first piston.

The connecting device according to the invention can be applied to the assembly of all parts in an axial direction requiring an increased tensile and compressive strength. The connecting device is adapted to the manufacture of any type of valve, in particular solenoid valves and all types of distributors. It is adapted to the hydraulic circuits in the automotive field and more particularly to the cooling circuits for the automotive field.

What is claimed is:

1. A device for connecting two parts stressed according to a first direction including:

a male portion of a first one of the two parts and a female portion of a second one of the two parts configured so that the male portion enters the female portion along a second direction normal to the first direction and configured so that the male portion is retained in the female portion in the first direction by a cylindrical bearing, a clip configured to lock the male portion in position into the female portion in the second direction, wherein the male portion includes, at one first end, an end portion whose outer surface is partially in the shape of a cylinder of revolution around the second direction, wherein the female portion includes a seat of cylindrical shape of revolution configured to house, substantially without clearance, the end portion of the male portion, and wherein the clip includes a first portion carried by the male portion and a second portion carried by the female portion, and wherein the seat is delimited by two opposite arms and wherein the second portion of the clip is carried by one free end of the arms.

2. The connecting device according to claim 1, wherein the seat and the clip is arranged such that, when the end portion slides in the seat along the second direction, the arms move apart along a third direction normal to the first direction and to the second direction until the first portion of the clip cooperates with the second portion of the clip.

3. The connecting device according to claim 1, wherein the male portion includes an intermediate portion between the first portion of the clip and the end portion, which includes two convex lateral surfaces centred on an axis which is parallel to the axis of the end portion and wherein the arms include, between the seat and the free end thereof, a concave surface centred on an axis which is parallel to the axis of the seat and together defining a housing for the intermediate portion.

4. The connecting device according to claim 1, wherein the clip includes contacting surfaces in the second direction and the male portion and the female portion include contacting surfaces in the first direction, the surfaces of the clip and the surfaces of the male and female portions being distinct.

5. The connecting device according to claim 1, wherein the clip includes bosses cooperating with recessed housings.

6. The connecting device according to claim 1, wherein the free ends of the arms carrying the second portion of the clip includes inclined faces so as to facilitate the clipping.

7. The connecting device according to claim 1, wherein the free ends of the arms each include a planar face contained in a plane normal to the first direction and wherein the male portion includes at least one planar face configured to cooperate with the planar faces of the second ends of the arms.

8. The connecting device according to claim 1, wherein at least the end portion of the male portion has a circular cross section.

9. A method for assembling a first part and a second part by means of the connecting device according to claim 1, the first part including the male portion and the second part including the female portion:

alignment of the male portion and the female portion in the second direction, insertion of the male portion into the female portion by relative displacement along the second direction until engagement of the clip.

10. A device for connecting two parts stressed according to a first direction including:

a male portion of a first one of the two parts and a female portion of a second one of the two parts configured so that the male portion enters the female portion along a second direction normal to the first direction and configured so that the male portion is retained in the female portion in the first direction by a cylindrical bearing, a clip configured to lock the male portion in position into the female portion in the second direction, wherein the male portion and the female portion are made of the same material.

11. A hydraulic distributor including an electromagnetic actuator, a first piston cooperating with a piston seat, and at least one device for connecting the first piston and a rod secured to a core of the actuator stressed according to a first direction, the at least one device including:

a male portion of a first one of the two parts and a female portion of a second one of the two parts configured so that the male portion enters the female portion along a second direction normal to the first direction and configured so that the male portion is retained in the female portion in the first direction by a cylindrical bearing, a clip configured to lock the male portion in position into the female portion in the second direction.

12. The distributor according to claim 11, being a 3/2 distributor including a second piston secured to the first piston in the first direction, the second piston cooperating with a piston seat, the first piston and the second piston being aligned in the first direction.

13. A hydraulic circuit including at least one hydraulic distributor according to claim 11, a fluid source connected to the hydraulic distributor.

14. A cooling circuit for a motor vehicle including at least one hydraulic distributor according to claim 11, a coolant source which is connected to the hydraulic distributor.

15. A device for connecting two parts stressed according to a first direction including:

a male portion of a first one of the two parts and a female portion of a second one of the two parts configured so that the male portion enters the female portion along a second direction normal to the first direction and configured so that the male portion is retained in the female portion in the first direction by a cylindrical bearing, a clip configured to lock the male portion in position into the female portion in the second direction, wherein the male portion and the female portion are each made from a plastic material.

16. The connecting device according to claim 15, wherein the male portion and the female portion are each made from a material selected from the group consisting of polyphenylene sulphide (PPS), the family of polyethersulphones (PESU), polyetheretherketone (PEEK) and polyphthalamide (PPA).

* * * * *